No. 788,567. PATENTED MAY 2, 1905.
L. C. WATKINS.
PRINTER'S REGISTER HOOK.
APPLICATION FILED APR. 7, 1902.
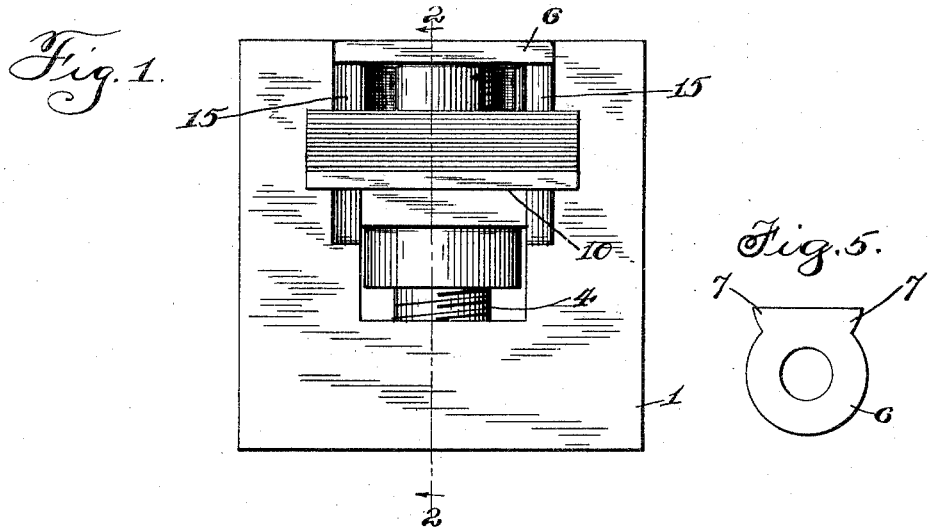
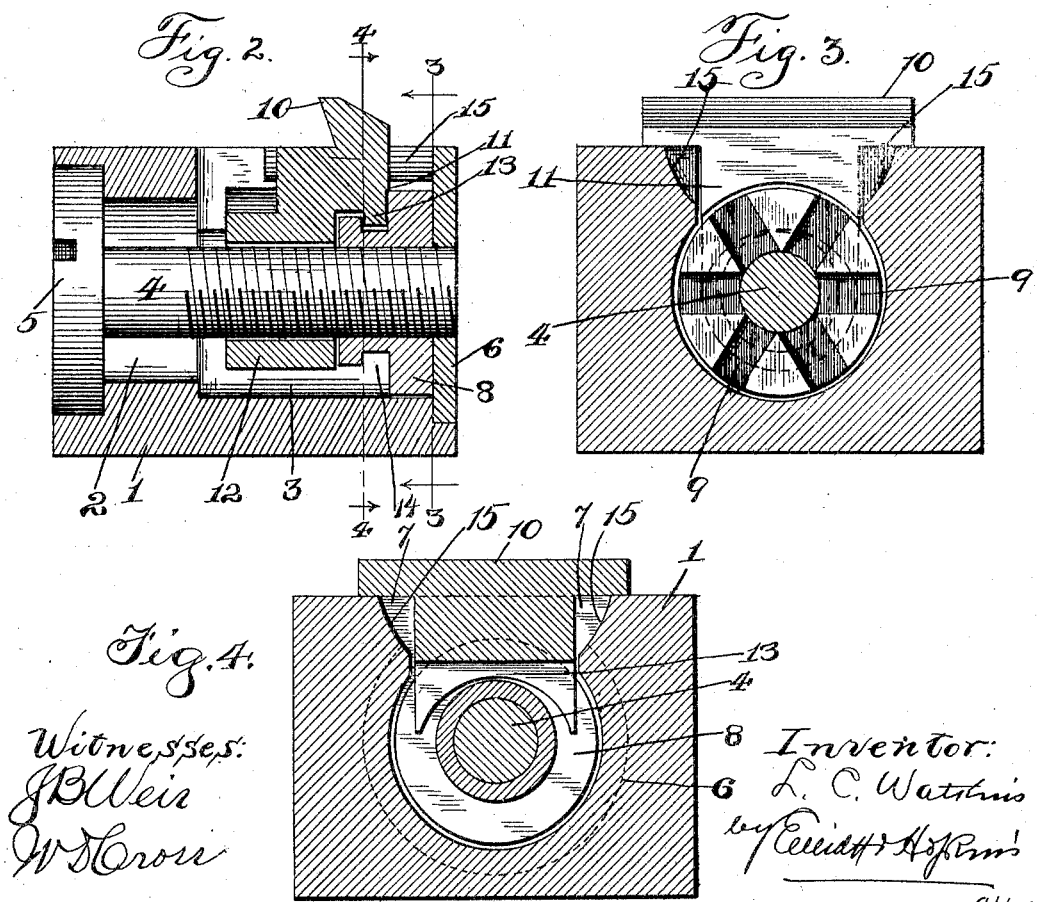

No. 788,567. Patented May 2, 1905.

UNITED STATES PATENT OFFICE.

LESTER C. WATKINS, OF CHICAGO, ILLINOIS, ASSIGNOR TO THE CHALLENGE MACHINERY CO., OF CHICAGO, ILLINOIS, A CORPORATION OF ILLINOIS.

PRINTER'S REGISTER-HOOK.

SPECIFICATION forming part of Letters Patent No. 788,567, dated May 2, 1905.

Application filed April 7, 1902. Serial No. 101,671.

*To all whom it may concern:*

Be it known that I, LESTER C. WATKINS, a citizen of the United States, residing at Chicago, in the county of Cook and State of Illinois, have invented certain new and useful Improvements in Printers' Register-Hooks, of which the following is a full, clear, and exact specification.

My invention relates to hooks or clamps for holding stereotype and other printing plates; and it has for its primary object to provide an improved and simple form in which the hook or sliding clamp shall have permanent connection with the nut which actuates it.

With these ends in view my invention consists in certain features of novelty in the construction, combination, and arrangement of parts by which the said object and certain other objects hereinafter appearing are attained, all as fully described with reference to the accompanying drawings, and more particularly pointed out in the claims.

In said drawings, Figure 1 is a plan view of my improved register-hook. Fig. 2 is a vertical longitudinal sectional view thereof, taken on the line 2 2, Fig. 1. Fig. 3 is a transverse section on the line 3 3, Fig. 2. Fig. 4 is a similar section on the line 4 4, Fig. 2, and Fig. 5 is a detail face view of the end plate hereinafter described.

1 is the block or body, which is provided with recesses 2 3, through which passes longitudinally a screw 4. The head 5 of this screw is let into one end of the block, as better shown in Fig. 2, so that its outer surface will be flush therewith, and the other end of the screw is threaded in an end plate 6, which is recessed in the other end of the block flush therewith and provided with a tongue 7 at the upper side, preferably flush with the face or top of the block to prevent plate 6 from turning; but any other suitable means for thus holding the end of the screw and enabling it to be securely clamped in the block may be employed. In assembling the parts the screw 4 is tightened up sufficiently to hold it against turning excepting when unusual power is applied thereto by means of a screw-driver or other suitable implement applied to the head of the screw, and threaded on the screw is a nut or turning-head 8, which is provided in its outer face with a number of radial wrench-sockets 9, as usual, whereby the nut or turning-head may be rotated on the screw, and thus caused to traverse the latter in the cavity or recess 3.

10 is the hook proper which engages the edge of the plate to be held, and which hook is formed with a shank 11, extending downwardly to and formed on or otherwise connected with a collar 12, which runs loosely on the screw 4. The under side of this hook is also formed with a beard or flange 13, which engages in a peripheral groove 14, formed in the nut or turning-head 8, and thereby permanently connects the hook 10 and its slide, which is constituted by the sleeve or collar 12, to the turning-head or nut 8, and consequently causes the slide and its hook to move back and forth along the screw as the nut 8 is revolved, the screw remaining stationary, as before explained. The upper side of the block 1 is slotted through into the recess or cavity 3 to permit the shank 11 to move back and forth, and the edges of this slot are beveled, as shown at 15, throughout that portion of its length which is traversed by the nut or turning-head 8, so as to permit of a wider swing of the turning-key or wrench applied to the sockets 9. The end of the sleeve or collar 12 is received in the recess or cavity 2.

By the means described it will be seen that the turning-head or nut 8 will move with the hook 10, and consequently the space left at the back of the hook 10 need never be greater than the width of such nut or head, or, in other words, no matter what the position of the hook may be the space left between it and the next plate need never be greater than is necessary for the insertion of the turning-key.

Having thus described my invention, what I claim as new therein, and desire to secure by Letters Patent, is—

1. In a device for the purpose described, the combination of a recessed block, a plate secured in one end of said recess and shouldered against the end of said block, a screw passing through said recess and threaded at one end in said plate, and having its other end formed with an enlarged head shouldered against said block, a slide loose on said screw, a hook projecting from said slide above the surface of said block, and a nut threaded on said screw between said slide and plate and rotatably attached to said slide.

2. A printer's block provided with a movable clamp, a fixed rod extending through an extension of said clamp, an adjusting device supported on said rod, and the clamp provided with means for retaining the adjusting device, whereby the adjusting device may adjust the clamp in either direction and travel with the same.

3. A printer's block provided with a movable clamp, a fixed screw-threaded rod passing loosely through an extension of said clamp, an adjusting-nut engaging with said rod, and the clamp provided with means for retaining the nut, whereby said nut may adjust the clamp in either direction and travel with the same.

4. A printer's block provided with a slot or recess in its supporting side, a sliding clamp extending above said side and provided with an extension projecting into said slot or recess, an adjusting device, and said extension having means for retaining said device, whereby the adjusting device may adjust the clamp in either direction and travel with the same.

5. A printer's block provided with a slot or recess in its supporting side, a movable clamp extending above said side, and provided with an extension projecting into said slot or recess, a fixed rod extending longitudinally of said slot or recess, and passing loosely through said extension, an adjusting device supported on said rod, and the extension provided with means for retaining the adjusting device, whereby said adjusting device may adjust the clamp in either direction and travel with the same.

6. A printer's block provided with a movable clamp extending above its surface and provided with a yoke, and an adjusting device held in said yoke and traveling with the clamp and adjustable along the course of said clamp.

7. A printer's block provided with a slot or recess in its supporting side, a movable clamp extending above said side and provided with an extension projecting into said slot or recess, a fixed screw-threaded rod extending longitudinally of said slot or recess and passing loosely through said extension, and an adjusting-nut engaging with said rod, and held to said clamp, whereby said clamp may be adjusted.

8. A printer's block provided with a slot or recess in its supporting side, a movable clamp extending above said side, and provided with a yoked extension projecting into said slot or recess, a screw-threaded rod extending longitudinally of said slot or recess and passing loosely through said extension, and an adjusting-nut held in said yoke and engaging with said rod, whereby said clamp may be adjusted.

9. A printer's block having a movable clamp extending above said block, and an adjusting device having recesses in its edge or periphery, and the clamp provided with means for retaining the adjusting device, whereby the adjusting device will travel with the clamp, and said clamp may be adjusted in either direction by a key engaging with the recesses of the adjusting device above the block.

10. A printer's block provided with a movable clamp, a rod extending through an extension of said clamp, an adjusting device supported on said rod, and a clamp provided with means for retaining the adjusting device.

11. A printer's block provided with a movable clamp, a screw-threaded rod passing through an extension of said clamp, an adjusting-nut engaging with said rod, and a clamp provided with means for retaining the nut.

LESTER C. WATKINS.

Witnesses:
M. B. ALLSTADT,
W. D. CROSS.